(12) United States Patent
Licht et al.

(10) Patent No.: US 11,721,180 B2
(45) Date of Patent: *Aug. 8, 2023

(54) SELF-SERVICE TERMINAL (SST) NETWORK REAL-TIME CLOUD MANAGEMENT

(71) Applicant: NCR Corporation, Atlanta, GA (US)

(72) Inventors: Yehoshua Zvi Licht, Alpharetta, GA (US); Grant Charles Paton, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,004

(22) Filed: Apr. 29, 2021

(65) Prior Publication Data

US 2021/0248878 A1 Aug. 12, 2021

Related U.S. Application Data

(63) Continuation of application No. 15/471,512, filed on Mar. 28, 2017, now Pat. No. 11,055,972.

(60) Provisional application No. 62/446,592, filed on Jan. 16, 2017.

(51) Int. Cl.
| | | |
|---|---|---|
| *G06Q 20/00* | (2012.01) | |
| *G07F 19/00* | (2006.01) | |
| *G06Q 20/10* | (2012.01) | |
| *G06Q 10/087* | (2023.01) | |
| *G06Q 20/18* | (2012.01) | |
| *G06Q 20/20* | (2012.01) | |

(52) U.S. Cl.
CPC ......... *G07F 19/211* (2013.01); *G06Q 10/087* (2013.01); *G06Q 20/1085* (2013.01); *G06Q 20/18* (2013.01); *G07F 19/209* (2013.01); *G06Q 20/202* (2013.01); *G06Q 20/203* (2013.01)

(58) Field of Classification Search
CPC ... G07F 19/211; G07F 19/209; G06Q 10/087; G06Q 20/1085; G06Q 20/18; G06Q 20/202; G06Q 20/203; H04L 67/12
USPC .......................................... 705/28
See application file for complete search history.

(56) References Cited

U.S. PATENT DOCUMENTS

| | | | |
|---|---|---|---|
| 11,055,972 B2 * | 7/2021 | Licht | ................ G07F 19/211 |
| 2017/0076306 A1 * | 3/2017 | Snider | ............... G06Q 30/0205 |
| 2018/0276674 A1 * | 9/2018 | Ramatchandirane | .. G06Q 20/18 |
| 2019/0334884 A1 * | 10/2019 | Ross | ....................... G06F 21/41 |

FOREIGN PATENT DOCUMENTS

CN 104753775 A * 7/2015

OTHER PUBLICATIONS https://web.archive.org/web/20170117135403/http://www.kal.com/en/.*
https://www.ibm.com/blogs/cloud-computing/2012/04/26/three-reasons-why-an-atm-is-like-a-cloud/.*

* cited by examiner

*Primary Examiner* — Russell S Glass
(74) *Attorney, Agent, or Firm* — Schwegman Lundberg & Woessner, P.A.

(57) ABSTRACT

Cloud-based methods and systems are presented for aggregating custom groupings of Self-Service Terminals (SSTs) and managing the SSTs through a network. Real-time information for the SSTs are gathered and interfaces are used to direct selective usage of particular SSTs within a grouping. The groupings optimized for reducing media replenishment and service of any particular SST within the grouping.

11 Claims, 4 Drawing Sheets

SELF-SERVICE TERMINAL (SST) NETWORK REAL-TIME CLOUD MANAGEMENT

CROSS-REFERENCE TO RELATED APPLICATION

This application is a continuation of US Application Serial No. claims priority to U.S. Provisional application Ser. No. 15/471,512, filed Mar. 28, 2017, which application claims priority to 62/446,592 entitled: "Cloud-Based Management of Self-Service Terminals," filed on Jan. 16, 2017; the disclosure of which are incorporated by reference herein in their entirety.

BACKGROUND

Cash (money currency and/or coins) management involves making sure that cash will be made available to or taken from physical locations. Cash management may include recycling, because it can reduce the amount of cash in transit and general movement of cash. The principle of recycling relies upon a balance of deposit notes to dispensed notes in order to ensure satisfactory service. Such factors range from the placement of Self-Service Terminals (SSTs) with a physical environment—those closest to the flow of customer traffic typically tend to provide the largest number of any given transaction type, such as cash dispenses and deposits.

Today, SSTs, such as Automated Teller Machines (ATMs), kiosks, etc., work independently of over self-service terminals and are largely managed independently of one another.

SUMMARY

In various embodiments, methods and a system for SST network real-time cloud management are presented.

According to an embodiment, a method for SST network real-time cloud management is provided. Specifically, and in an embodiment, real-time metrics from Self-Service Terminals (SSTs) are received over network connections. Some of the SSTs is customized organized into a group of SSTs. The SSTs of the group are managed as a single aggregate SST based on the collective real-time metrics for the group.

DETAILED DESCRIPTION

Figure 1:
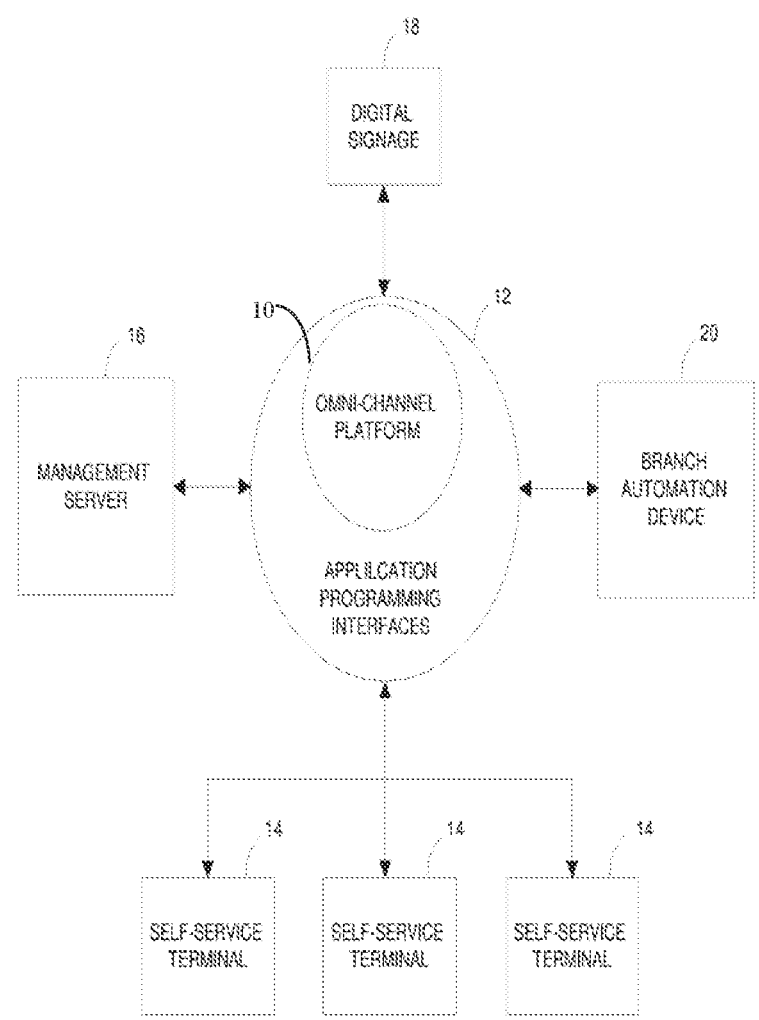
FIG. 1 is a diagram of a system for SST network real-time cloud management, according to an example embodiment.

FIG. 1 is a diagram of a system for SST network real-time cloud management, according to an example embodiment. The system is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the SST network real-time cloud management techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for SST network real-time cloud management can be implemented in all, or some combination of the components shown in different hardware computing devices having one or more hardware processors.

The system includes: an Omni-channel platform 10 associated with Application Programming Interfaces (APIs), a plurality of SSTs 14 accessible over a network connection, a management server 16, digital signage 18, and a branch automation device 20.

The Omni-channel platform 10 provides communications between systems and applications connected to platform 10. In an example configuration, each system connects to platform 10 through an API 12. The Omni-channel platform 10 may be a cloud-based system connected to a network, which may include a global communications network, also known as the Internet. The system includes computers with processors, memory, and program and data storage.

In one example, the SSTs 14 connect to platform 10 through the network and APIs 12. The SSTs 14 communicate operating information to management server 16 through platform 10. The SSTs 14 also received control information from management server 16 through platform 10.

In one example, the SSTs 14 also exchange operating information with each other through the network and the APIs 12. The SSTs execute local management software, which is configured based upon information from other SSTs 14.

In one example, the SSTs 14 include ATMs, with cash handling peripherals, such as cash acceptance devices, cash dispensing devices, and cash recyclers.

In one example, the SSTs 14 include self-service checkout terminals, which may also include one or more cash handling peripherals.

In one example, the SSTs 14 include kiosks, which may also include one or more cash handling peripherals.

Management server 16 is connected to platform 10 through the network and one of APIs 12. Management server 16 includes management software for managing the SSTs 14 individually and as dynamically established and changeable groupings.

In one example, the management software automatically configures each SST 14 based upon the operating information received from the SSTs 14 and the physical location of each SST. Thus, the management software may manage the SSTs 14 individually and as a custom-defined and dynamically-created group of SSTs.

In one example, the management software configures SSTs 14 for optimal levels of cash based upon the levels of acceptance and dispensing of cash reported by the SSTs 14 within the area or grid defined by the locations of the SSTs 14. The grid based on geographical proximity of the SSTs to one another.

In one example mode of operation, the management software configures the SSTs 14 for specific optimal amounts of cash based upon a predetermined optimal replenishment cycle, with a goal of fewer replenishments. The specific amounts of cash may be based upon the self-service terminals 14 as a group and the historical levels of cash acceptance and dispensing occurring with the grid.

In one example, the management software may further control acceptance and dispensing at individual SSTs 14 by displaying messages on co-located digital signage 18. For example, when cash amounts are running low at one particular SST 14, users may be directed to a different SST 14.

In one example, digital signage 18 may also display other messages alerting users to the functionality of the SSTs 14 and recommending a particular one of the SSTs 14 for the users to access.

In one example, digital signage 18 includes software which is also connected to platform 10 and which communicates with management server 16 through the global communication network and one of APIs 12.

In one example, the system may be expanded to facilitate management of the SSTs 14 through the use of a portable computing device, such as a tablet computer (a type of branch automation device 20). The tablet computer includes software which is also connected to platform 10 and which communicates with management server 16 and SSTs 14 through the global communication network and one of APIs 12

In one example, one notable benefit of using a tablet computer (branch automation device 20) is resolution of cash jams in cash handling peripherals, requires knowing the area of jam occurrence—pre-validation or post-validation, where the cash belongs to the customer if pre-validation and to the bank if post-validation. Tablet software may present information regarding the jam clearly and effectively to a teller or service person. Networking of the devices would further enable synchronization of digital signage 18 and/or terminal screen content to enable all SSTs 14 to contribute collectively to the sequencing and choreographing of lighting, illumination of card readers, and other operations.

An example method of operation includes establishing a group of SSTs 14 within an area to be managed by a cloud-based management server 16, determining locations of a group of SSTs 14 within the area by the cloud-based management server 16, determining historical levels of cash dispensing and acceptance from the SSTs 14 by the cloud-based management server 16, and configuring the SSTs 14 as a group with optimal levels of cash by the cloud-based management system 16 based on historical use.

In an embodiment, the branch automation device 20 is a tablet computer.

In an embodiment, the branch automation device 20 is a local branch server that manages local branch SSTs 14.

In an embodiment, the branch automation device 20 is a standalone terminal located within a branch that manages the local branch SSTs 14.

In an embodiment, the SSTs 14 are equipped with small network transmission device that is part of the Internet-of-Things (IoTs), which gathers operational metrics, such cash dispenses and cash deposits, and status information such as online or offline. The IoT-enabled devices reports these metrics and status information in real time through an API 12 to the platform 10. The metrics and status information can be encrypted through the API 12 and wirelessly transmitted through the platform 10. Each transmission includes an identifier for the IoT-enabled device that is known to be linked to a specific SST 16 and a specific geographical and physical location of that SST 16.

In an embodiment, the management server 16 can be cloud-based and gather the metrics reported in real-time by the SSTs 14 through the APIs 12.

The management server 16 can be configured (through an interface or through configuration settings) to custom and dynamically group selective SSTs 14 based on a geographical relationship between the SSTs 14. That is, all SSTs with a particular venue or even a section of a venue can be grouped together as a logical and aggregated single SST 14 for collective management. This allows the management server to proactively manage the available currency for a custom grouping of SSTs 14. The management server 16 also uses the APIs 12 to proactively direct customers to SSTs that have excess cash and proactively steer customers away from SSTs in the group that are running low on cash. This can be achieved by the APIs 12 displaying status information regarding the SSTs 14 on the digital signage 18 physically situated where the group of SSTs 14 are located. This also can be achieved by providing the metrics and status information to customers through their mobile banking application processed on the consumer's mobile devices. Moreover, this permits the SSTs 14 of the custom group to require less maintenance to replenish cash.

For example, suppose that three ATMs 14 are located at a small airport. The first-accessible ATM 14 at the airport when entering through the security gates is going to be in need of cash replenishment soon. The three ATMs 14 are organized as a logical grouping of ATMs 14 by the management server 16. The management server 16 can display on digital signage 18 at the airport that the two other ATMs 14 are fully stocked for cash withdrawals but the ATM 14 near the security gate is running low on cash reserves. Moreover, as customers request an ATM 14, the management server 16 uses the API 12 to instructing the banking application of the customers to select the two ATMs 14 that are fully stocked for cash withdrawals. The banking application can even provide walking directions to the customers from their current location to the closest one of the two ATMs 14. In this way, the management server 16 proactively depletes the cash of the two ATMs 14 that are fully stocked. Conversely, customers desiring to deposit cash can be directed through the same mechanisms to the ATM 14 that was low on cash near the security gates. This results in the three ATMs 14 needed replenished with cash at nearly the same time, which means that a technician only has to visit the airport once to replenish all three ATMs 14; rather, than visiting the airport multiple times to service a single one of the ATMs 14 on each separate visit.

By collectively aggregating the management of the SSTs 14 through the platform 10 and the APIs 12, the management server can reduce expense of the servicing SST companies or organizations. Furthermore, customers are satisfied because an available SST 14 is always nearby and easily located through the management server's API direction to the customer's banking application and/or digital signage 18.

The SSTs 14 are equipped with IoTs devices that report real-time status and metrics to the platform 10 through the APIs 12. The management server 16 logically aggregates and custom groups the SSTs together based on configured parameters, such as physical proximity between the SSTs 14 and/or based on the SSTs 14 being located within a same venue. The management server then proactively uses the APIs 12 to change the customer traffic and transactions to specific SSTs 14 in the grouping to balance replenishment needs of the SSTs 14 and reduce service calls.

These and other embodiments are now discussed with reference to the FIGS. 2-4.

Figure 2:
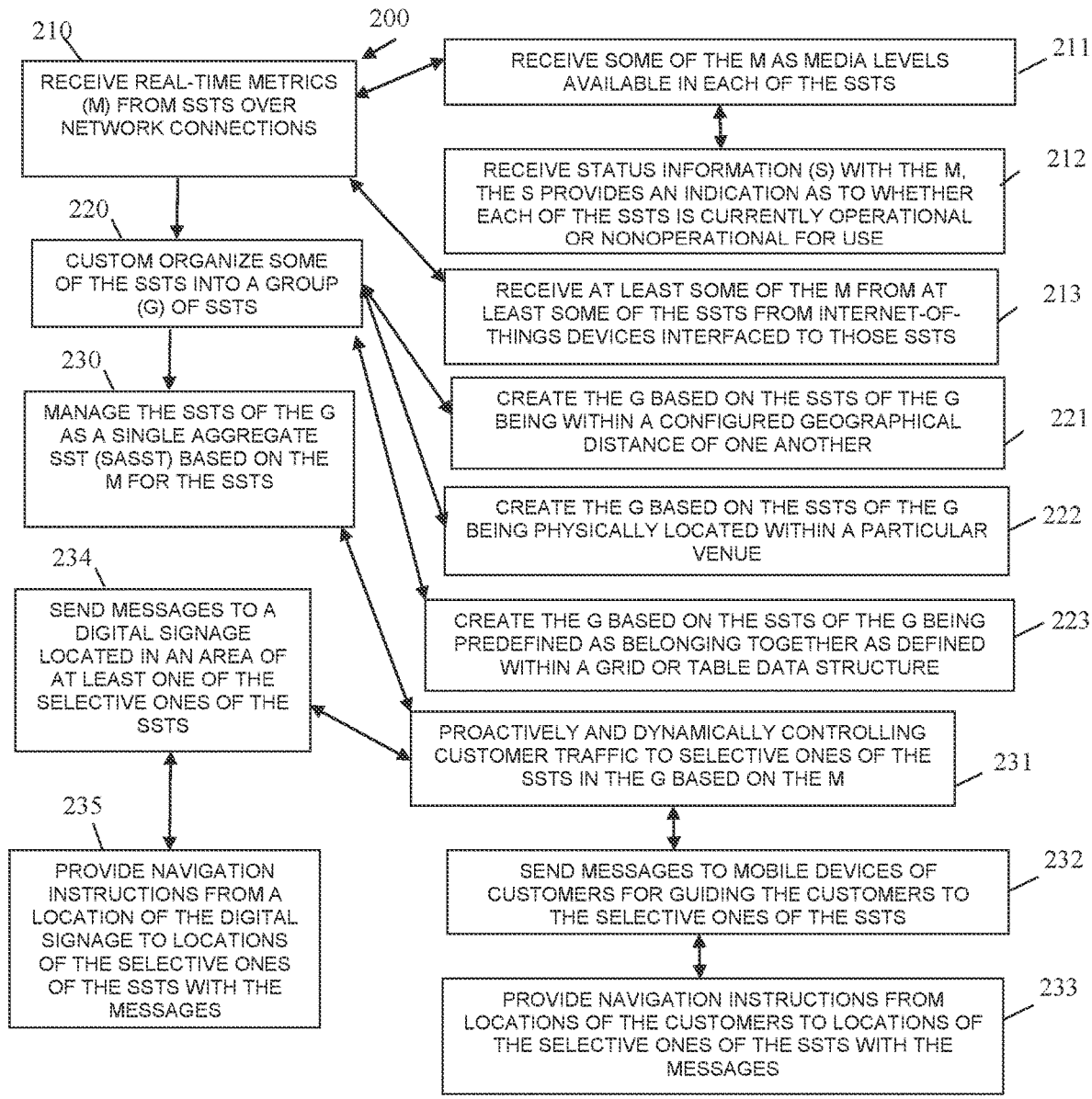
FIG. 2 is a diagram of a method for SST network real-time cloud management, according to an example embodiment.

FIG. 2 is a diagram of a method 200 for SST network real-time cloud management, according to an example embodiment. The software module(s) that implements the method 200 is referred to as a "SST network manager." The SST network manager is implemented as executable instructions programmed and residing within memory and/or a non-transitory computer-readable (processor-readable) storage medium and executed by one or more hardware processors of a hardware computing device. The processors of the device that executes the SST network manager are specifically configured and programmed to process the SST network manager. The SST network manager has access to one or more networks during its processing. The networks can be wired, wireless, or a combination of wired and wireless.

In an embodiment, the device that executes the SST network manager is a single device or set of devices that process in a cloud processing environment.

In an embodiment, the device that executes the SST network manager is a server.

In an embodiment, the SST network manager is the management server 16.

In an embodiment, the SST network manager is all or some combination of the management server 16, the platform 10, and the APIs 12.

In an embodiment, the SSTs being managed by the SST network manager are ATMs.

In an embodiment, the SSTs being managed by the SST network manager are kiosks.

In an embodiment, the SSTs being managed by the SST network manager are a combination of ATMs and kiosks.

At 210, the SST network manager receives real-time metrics from SSTs over network connections.

In an embodiment, the SST network manager manages the SSTs over a plurality of network connections through platform 10.

According to an embodiment, at 211, the SST network manager receives some of the real-time metrics as media levels available in each of the SSTs.

In an embodiment of 211 and at 212, the SST network manager receives status information with the real-time metrics that status information providing an indication as to whether each of the SSTs is currently operational or non-operational for customer use and customer transactions.

In an embodiment, at 213, the SST network manager receives at least some of the metrics from at least some of the SSTs from IoTs devices interfaced to those SSTs.

At 220, the SST network manager custom organizes some the SSTs into a group of SSTs.

In an embodiment, at 221, the SST network manager creates the group based on the SSTs of the group being within a configured geographical distance of one another.

In an embodiment, at 222, the SST network manager creates the group based on the SSTs of the group being physically located within a particular venue or establishment.

In an embodiment, at 223, the SST network manager creates the group based on the SSTs of the group being predefined as belonging together as a grouping as defined within a grid or table data structure.

At 230, the SST network manager manages the SSTs of the group as a single aggregate SST based on the real-time metrics and historical metrics for the SSTs.

According to an embodiment, at 231, the SST network manager proactively and dynamically controls customer traffic to selective ones of the SSTs in the group based on the real-time metrics.

In an embodiment of 231 and at 232, the SST network manager sends messages to mobile devices of customers for guiding the customers to selective ones of the SSTs based on the real-time metrics.

In an embodiment of 232 and at 233, the SST network manager provides navigation instructions from locations of the customers (based on locations reported by the mobile devices of the customers) to locations of the selective ones of the SSTs with the messages.

In an embodiment of 231 and at 234, the SST network manager sends messages to a digital signage located in an area of at least one of the selective ones of the SSTs.

In an embodiment of 234 and at 235, the SST network manager provides navigation instructions from a location of the digital signage to locations of selective ones of the SSTs with the messages. The navigation instructions can be pushed to the mobile devices of the customers or presented on the digital signage.

It is noted that embodiments 232-233 and 234-235 are not mutually exclusive, such that the SST network manager can simultaneously send messages to the customers' mobile devices and the digital signage in an effort to proactive control, steer, and guide traffic to specific ones of the SSTs based on the real-time metrics of the SSTs being managed as a group.

Figure 3:
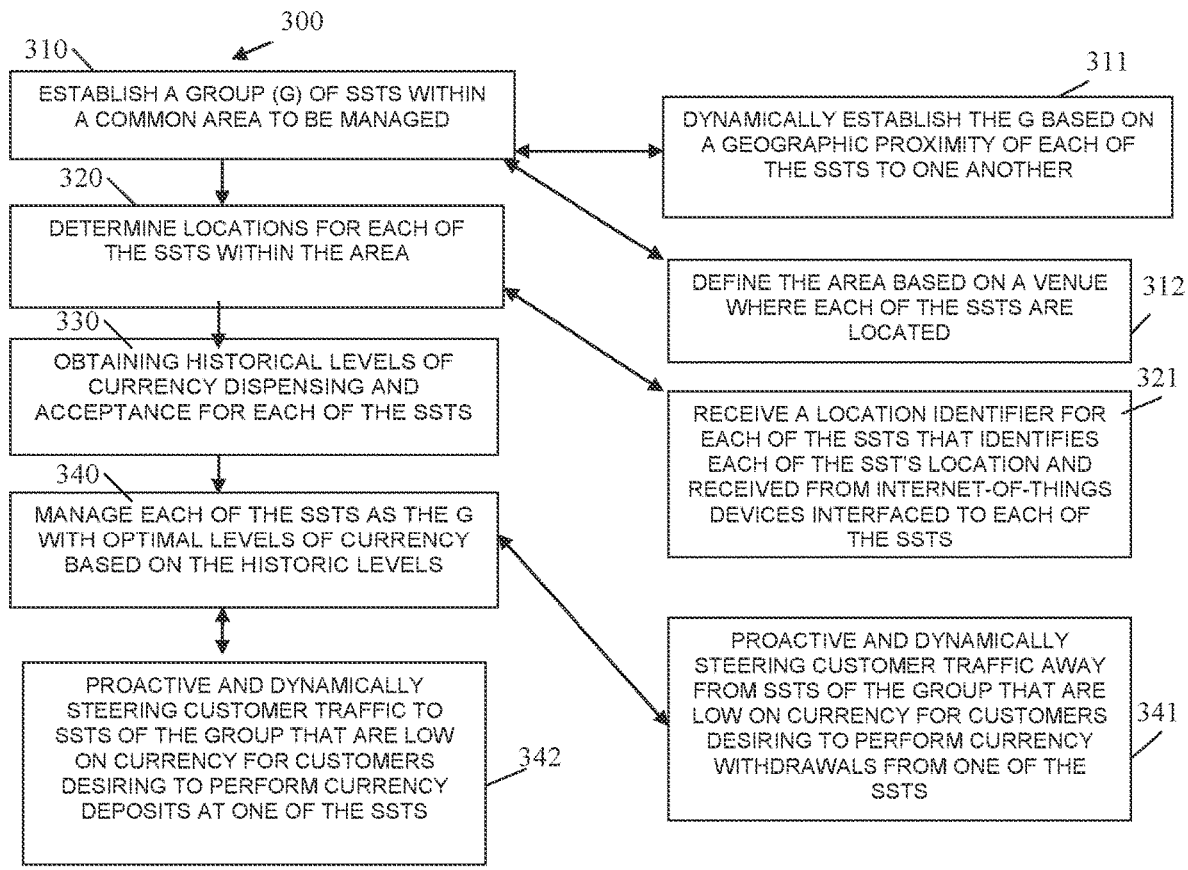
FIG. 3 is a diagram of another method for SST network real-time cloud management, according to an example embodiment.

FIG. 3 is a diagram of another method 300 for SST network real-time cloud management, according to an example embodiment. The software module(s) that implements the method 300 is referred to as a "SST group manager." The SST group manager is implemented as executable instructions programmed and residing within memory and/or a non-transitory computer-readable (processor-readable) storage medium and executed by one or more hardware processors of a hardware device. The processors of the device that executes the SST group manager are specifically configured and programmed to process SST group manager. The SST group manager has access to one or more networks during its processing. The networks can be wired, wireless, or a combination of wired and wireless.

In an embodiment, the device that executes the SST group manager is a single device or set of devices that process in a cloud processing environment.

In an embodiment, the device that executes the SST group manager is a server.

In an embodiment, the SST group manager is the management server 16.

In an embodiment, the SST group manager is all or some combination of the management server 16, the platform 10, the APIs 12, and/or the method 200.

In an embodiment the SST group manager manages groupings of SSTs and the SSTs are one of: ATMs, kiosks, and combinations of ATMs and kiosks.

At 310, the SST group manager establishes a group of SSTs within a common area to be managed. This is done over a plurality of network connections through platform 10 and the APIs 12 and received in real time by the SST group manager.

According to an embodiment, at 311, the SST group manager dynamically establishes the group based on a geographic proximity of each of the SSTs to one another.

In an embodiment, at 312, the SST group manager defines the area based on a venue or establishment where each of the SSTs are physically located.

At 320, the SST group manager determines locations for each of the SSTs within the area.

In an embodiment, at 321, the SST group manager receives a location identifier for each of the SSTs that identifies each of the SST's physical location. The SST group manager receives the locations identifiers from IoT devices interfaced to each of the SSTs.

At 330, the SST group manager obtains historical levels of currency dispensing (withdrawals) and currency acceptance (deposits) for each of the SSTs.

At 340, the SST group manager manages each of the SSTs as the group with optimal levels of currency present in each of the SSTs based on the historic levels.

According to an embodiment, at 341, the SST group manager proactively and dynamically steers or directs custom traffic away from the SSTs of the group that are low on currency for customers desiring to perform currency withdrawals from one of the SSTs of the group.

In an embodiment, at 342, the SST group manager proactively and dynamically steers or directs customer traffic to SSTs of the group that are low on currency for customers desiring to perform currency deposits at one of the SSTs.

In an embodiment of 341 and 342, the SST group manager can dynamically steer or direct the customer traffic though messages sent to mobile devices of the customers and/or through messages sent to digital signage present in the area of the group of SSTs.

Figure 4:
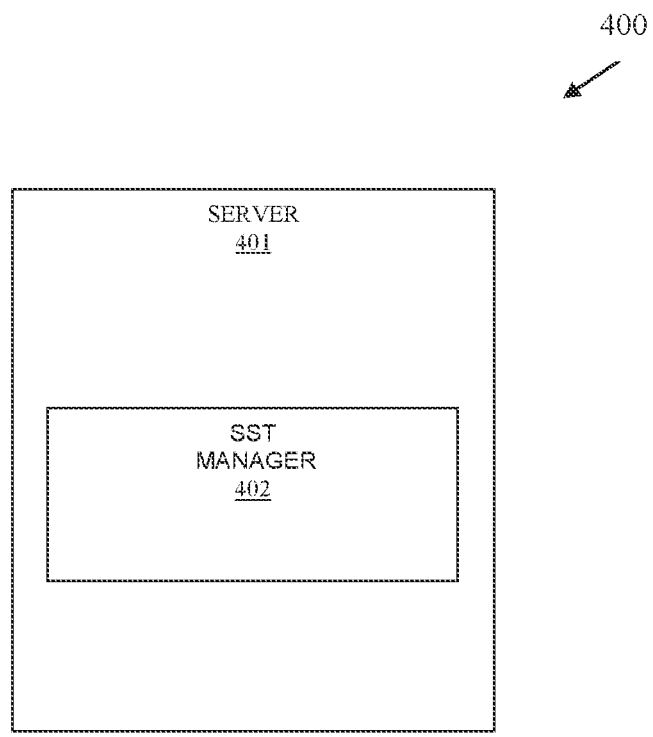
FIG. 4 is a diagram of another system for SST network real-time cloud management, according to an example embodiment.

FIG. 4 is a diagram of another system 400 for SST network real-time cloud management, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the processing described above with the FIG. 1.

In an embodiment, the system 400 implements, inter alia, the method 200 of the FIG. 2.

In an embodiment, the system 400 implements, inter alia, the method 300 of the FIG. 3.

The system 400 includes a server 401 and the server including SST manager 402.

In an embodiment the system 400 manages custom collections, over a network, of SSTs, the collections comprise one of: ATMs, kiosks, and combinations of ATMs and kiosks.

The SST manager 402 is configured to: 1) execute on at least one hardware processor of the server 401; 2) custom group selective SSTs into a group based on geographic proximity of the SSTs to one another, 3), manage the SSTs as a group, and 4) proactively guide customer traffic to particular SSTs of the group and to other SSTs of the group based on media levels and operational statuses of each of the SSTs of the group.

In an embodiment, the SST manager 402 is the method 200, the method 300, the processing discussed in the FIG. 1, and/or some combination of these.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   processing a platform comprising Application Programming Interfaces (APIs), a cloud processing environment, and Internet-of-Things (IoTs) devices connected to the platform over a network;
   interfacing each IoTs device to a Self-Service Terminal (SST), each SST associated with a known location;
   maintaining by the cloud processing environment a mapping between each IoTs device to the corresponding SST at the corresponding known location;
   obtaining, in real time and by each IoTs device, metrics and a status from the corresponding SST;
   sending by each IoTs device using the APIs the corresponding metrics and the corresponding status to the cloud processing environment over the platform;
   dynamically organizing by the cloud processing environment, the SSTs into groups based on the metrics and the statuses of the SSTs using the mapping; and
   managing by the cloud processing environment the groups based on group metrics and the corresponding statuses of each SST within each group using the corresponding known locations of the mapping.

2. The method of claim 1 further comprising, dynamically changing by the cloud processing environment assignments of the SSTs to the groups based at least in part on updated metrics, updated statuses, and the known locations of the SSTs using the mapping.

3. The method of claim 1, wherein managing further includes managing each group based on currency levels reported in the metrics for each SST of the corresponding group.

4. The method of claim 3, wherein managing further includes dynamically directing by the cloud processing environment a customer at a particular SST assigned to a particular group to a second SST assigned to the particular group based on the corresponding known locations of the particular SST and the second SST and based on particular currency levels of the particular SST and the second SST using the APIs.

5. The method of claim 3, wherein managing further includes managing each group based on the currency levels reported in the metrics for each SST of the corresponding group and further based on historical currency levels.

6. The method of claim 5, wherein managing further includes managing each group based the currency levels reported in the metrics and the historical currency levels for each SST of the corresponding group and further based on a predefined optimal currency level maintained for the corresponding group at the corresponding known locations of the particular SST and the second SST.

7. The method of claim 1, wherein processing further includes processing tablet computers connected to the platform.

8. The method of claim 7, wherein managing further includes reporting a particular status of a particular SST assigned to a particular group to a particular tablet based on particular locations associated with the particular group using the mapping and the APIs.

9. The method of claim 1, wherein sending further includes encrypting by the IoTs devices the metrics and the statuses through the APIs.

10. The method of claim 9, wherein encrypting further includes wirelessly transmitting by the IoTs devices the metrics and the statuses to the cloud processing environment.

11. The method of claim 1, wherein managing further includes managing each group as a single aggregate SST based on the corresponding metrics and statuses of the corresponding group.

* * * * *